(12) United States Patent
Sablier

(10) Patent No.: US 9,120,702 B2
(45) Date of Patent: Sep. 1, 2015

(54) USE OF CELLULAR CONCRETE AGGREGATES AND MANUFACTURING PROCESS

(75) Inventor: Guillaume Sablier, Morestel (FR)

(73) Assignee: Cemex Research Group AG, Brugg Bei Biel (CH)

( * ) Notice: Subject to any disclaimer, the term of this patent is extended or adjusted under 35 U.S.C. 154(b) by 153 days.

(21) Appl. No.: 13/811,194

(22) PCT Filed: Jul. 21, 2011

(86) PCT No.: PCT/FR2011/051763
§ 371 (c)(1),
(2), (4) Date: Apr. 4, 2013

(87) PCT Pub. No.: WO2012/010804
PCT Pub. Date: Jan. 26, 2012

(65) Prior Publication Data
US 2013/0181366 A1    Jul. 18, 2013

(30) Foreign Application Priority Data

Jul. 21, 2010 (FR) ...................... 10 03056

(51) Int. Cl.
| | |
|---|---|
| C04B 20/02 | (2006.01) |
| C04B 28/04 | (2006.01) |
| C04B 38/08 | (2006.01) |
| B02C 23/08 | (2006.01) |
| C04B 111/40 | (2006.01) |
| C04B 111/60 | (2006.01) |

(52) U.S. Cl.
CPC ............. *C04B 20/026* (2013.01); *B02C 23/08* (2013.01); *C04B 28/04* (2013.01); *C04B 38/08* (2013.01); *C04B 2111/40* (2013.01); *C04B 2111/60* (2013.01); *Y02W 30/95* (2015.05)

(58) Field of Classification Search
None
See application file for complete search history.

(56) References Cited

U.S. PATENT DOCUMENTS

| | | | | | |
|---|---|---|---|---|---|
| 2,081,802 | A | * | 5/1937 | Anders | 106/641 |
| 4,351,670 | A | * | 9/1982 | Grice | 106/672 |
| 4,900,359 | A | * | 2/1990 | Gelbman | 106/681 |
| 5,183,505 | A | * | 2/1993 | Spinney | 106/672 |
| 6,131,344 | A |   | 10/2000 | Schneider et al. | |
| 2001/0049404 | A1 | * | 12/2001 | Shulman | 523/218 |
| 2006/0260514 | A1 | * | 11/2006 | Chang | 106/745 |
| 2008/0017077 | A1 | * | 1/2008 | Abbate | 106/679 |

FOREIGN PATENT DOCUMENTS

| | | |
|---|---|---|
| DE | 195 30 607 | 2/1997 |
| DE | 10 2007 062492 | 6/2009 |
| JP | 2001 199757 | 7/2001 |

OTHER PUBLICATIONS

Müller-Rochholz, "Determination of the elastic properties of lightweight aggregate by ultrasonic pulse velocity measurement" (1979) The International Journal of Lightweight Concrete, vol. 1, No. 2, pp. 87-90.
International Search Report, PCT/FR2011/051763, mailed Dec. 13, 2011.

* cited by examiner

*Primary Examiner* — Mary F Theisen
(74) *Attorney, Agent, or Firm* — Merchant & Gould P.C.

(57) ABSTRACT

Cellular concrete aggregates sized between 2 and 25 mm and having a bulk density in the dry state of between 200 and 600 kg/m$^3$ enable their agglomeration by a binder for the manufacture of lightweight and insulating concrete or for the manufacture of slabs, screeds, formwork walls or prefabricated parts. A process for manufactures cellular concrete aggregates of at least 2 mm.

5 Claims, 4 Drawing Sheets

PRIOR ART

USE OF CELLULAR CONCRETE AGGREGATES AND MANUFACTURING PROCESS

This application is a National Stage Application of PCT/FR2011/051763, filed 21 Jul. 2011, which claims benefit of Ser. No. 10/03056, filed 21 Jul. 2010 in France and which applications are incorporated herein by reference. To the extent appropriate, a claim of priority is made to each of the above disclosed applications.

The present invention relates to a building material which allows manufacturing lightweight and thermally insulating concrete, for its use both as ready-mixed concrete and in the manufacture of prefabricated parts.

The use of the lightweight aggregates in concrete is known and a wealth of materials is regularly used, like expanded clay, expanded glass, polystyrene, etc.

The present invention relates to the aggregates obtained from the cellular concrete, having granulometric characteristics which allow aggregating them by means of a hydraulic binder (lime, activated clay, and all types of cements according to rule EN 197-1, etc.); preferably, cement-type binders will be used.

Cellular concrete whose design goes back to 1924 by J. A. Erikson is manufactured substantially from sand, Portland cement, lime and water which gives it the characteristics of a stone: solid, hard, undeformable, rot-proof and non flammable. Its alveolar structure constituted by air micro-cells gives it the properties of a reduced bulk density and thermal and acoustic insulation. It is substantially distributed in the form of blocks with multi-dimensional characteristics in order to suit most of the construction systems of the masonry. Its manufacturing process does not reject any substance likely to pollute water or soils. In the atmosphere, the only gas released into the atmosphere is water vapor. However, the manufacturing process generates cellular concrete wastes for an estimated amount of approximately 3% of the total manufactured volume. These wastes come from the thick leftover layer of material at the bottom of the mold, useless for manufacturing blocks, and the rubble from finished products. This cellular concrete waste is partially recycled in the manufacturing process or particularly recovered to be used as absorbing or insulating product. The rest is dumped in landfills.

The manufacture of lightweight insulating concrete is traditionally made from aggregates of natural minerals (pozzolana), heated natural minerals (Pearlite, exfoliated vermiculite or expanded clay pebbles) or polystyrene beads. The use of these materials leads to the generation of an impact on the environment as the exploitation of natural resources or the emission of greenhouse gases.

The use of aggregates of cellular concrete for the manufacture of lightweight and insulating concrete in replacement of these materials allows providing both a way to recover non-recycled concrete wastes and to limit the negative impact on the environment of the traditional alternatives.

Cellular concrete typically has a bulk density ranging between 350 kg/m$^3$ and 550 kg/m$^3$.

The bulk density of the aggregated produced from a specific cellular concrete remains unchanged as long as the size of the aggregates remains above approximately 1-2 mm. The size of the cellular concrete micro-cells range from a few tenths of millimeter to approximately two millimeters in diameter, aggregates with a size too small, that is to say less than 2 mm, would virtually eliminate the presence of these micro-cells in the material, thereby reducing significantly or would even destroy its properties of reduced bulk density and thermal and acoustic insulation, which are expected in lightweight and insulating concrete.

To give the concrete produced with the obtained aggregates, the lightness and thermal insulation properties, it is advisable to avoid aggregates in a bracket size of less than 1-2 mm.

Obtaining lightweight aggregates with a controlled particle size distribution made from cellular concrete is a difficult operation because the resistance of the raw material blocks is very low. The crushing and sieving of the raw material, and more specifically, each mechanical action on the cellular concrete (shock, friction, compression, . . . ) cause a significant production of fines with less than 1-2 mm in average size, inappropriate for its use as aggregate in lightweight and insulating concrete. A crushing operation that generates too much fine particles, for example more than 55% by weight, is industrially inefficient.

The aggregates obtained must be also homogeneous in size and must have a round shape that determines the properties of the future concrete placement. In addition, aggregates with sharp and fragile edges would give origin during the handling, transport and mixing with cement and water, to a new large amount of fine particles that should be retrieved prior to its use or else they will deteriorate the quality of the concrete should they arise during the preparation of the concrete.

The invention relates to aggregates obtained from cellular concrete waste that are particularly suitable for its application in the concrete for the manufacture of walls, slabs or any other form otherwise obtained through by the placement of ready-mixed concrete or in prefabricated parts.

Thus, an object of the invention is the use of aggregates of cellular concrete sized between 2 and 25 mm and having a bulk density in the dry state ranging from 200 to 600 kg/m3, enabling their agglomeration by a binder for the manufacture of lightweight and insulating concrete. Another object of the invention is the use of the aforementioned aggregates for the manufacture of slabs, screeds, formwork walls or prefabricated parts, as for instance, blocks, horizontal or vertical reinforcement blocks, beams, pre-walls . . . .

In light of an optimized use, the aggregates preferably meet the following properties, either considered alone or combined: their bulk density in the dry state ranges from 350 to 550 kg/m3; they are sized from 4 to 12 mm.

As noted earlier, said binder can be chosen from any hydraulic binder such as lime, activated clays, all types of cements in accordance with the standard EN 197-1, etc.; cement-type binders and particularly Portland cements are preferred.

The invention also relates to a process for manufacturing aggregates for their use in concrete, obtained by crushing cellular concrete waste.

Thus, yet another object of the invention is a process for manufacturing cellular concrete aggregates having at least 2 mm in size, which includes the following steps:
  blocks of cellular concrete having a bulk density in the dry state ranging from 200 to 600 kg/m3 are made available,
  the blocks are crushed,
  the crushed blocks are dry sieved so as to remove fines and aggregates smaller than 2 mm, and
  aggregates having at least 2 mm in size are recovered.

According to an advantageous process of the invention, aggregates with a size non larger than 25 mm are manufactured. For this purpose, the sieving operation also allows eliminating aggregates larger than 25 mm The cellular concrete blocks treated with the process of the invention have highly variable dimensions and it may be advantageous to provide, prior to engaging into the above steps, one or several series including a pre-crushing step and a sieving step, so as to obtain blocks with sizes ranging between 2 and 8 mm, which are then treated as described above.

The different objects and advantages of the invention are hereinafter set forth more in detail, based on the following FIGS. 1-5 and table 1:

Figure 3:
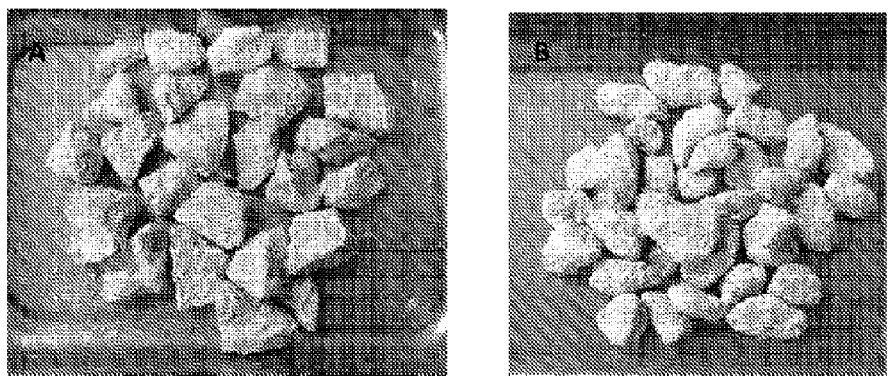

FIG. 3 presents photos of cellular concrete aggregates obtained by crushing (jaw crushers) before sieving (A) and after sieving (B).

Figure 4A:
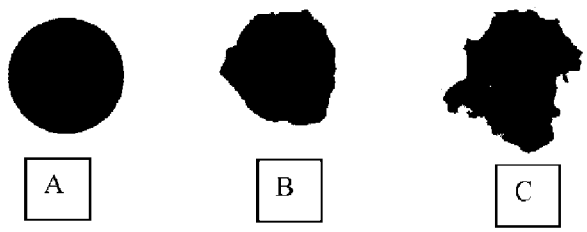
Figure 4B:
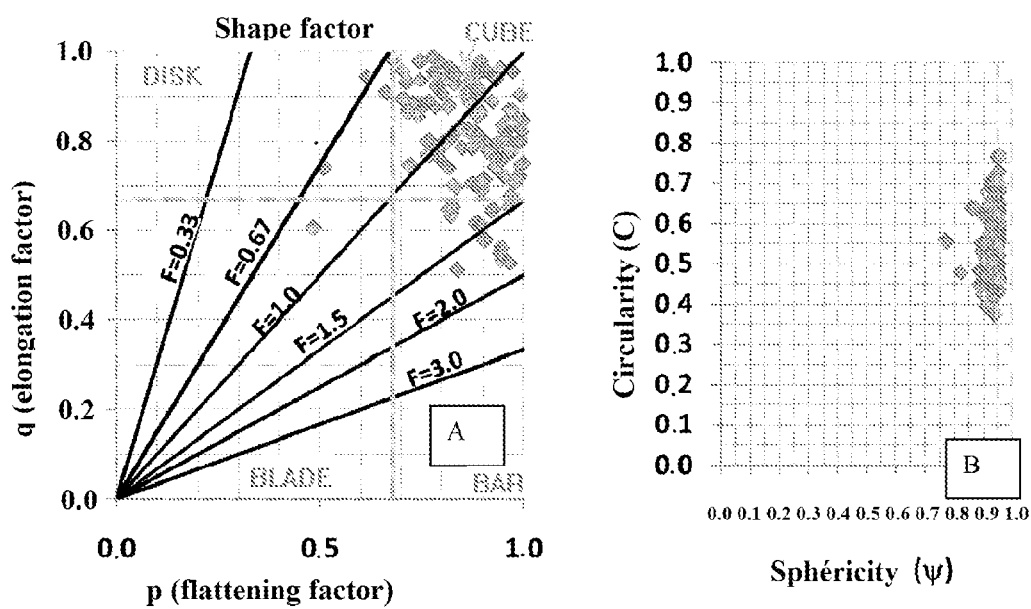

FIGS. 4a and 4b illustrate aggregates with different morphologies, FIG. 4a provides examples of aggregates having different C circularities: A. C=1; C=0.77; and (c). C=0.38; and FIG. 4b provides the results of morphological measurements of the aggregates according to the manufacturing process; the graph A represents the F shape factor, depending on factors such as elongation q and flattening p; B represents the sphericity $\Psi$ depending on circularity C.

Figure 5:
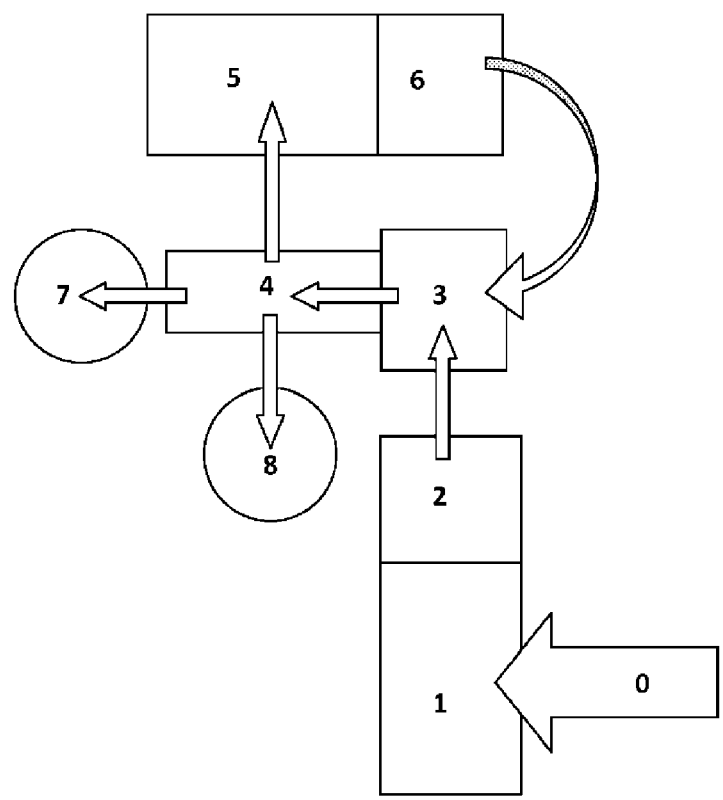

FIG. 5 is a diagram of a crushing and sieving plant of cellular concrete wastes; the arrows correspond to the cycle followed by the material.

The following Table 1 collects a set of examples on the size of the cellular concrete wastes coming from manufacturing off-cuts.

TABLE 1

|  | Max Length (cm) | Max width (cm) | Max thickness (cm) |
| --- | --- | --- | --- |
| Block 1 | 33 | 21 | 5.5 |
| Block 2 | 25 | 17 | 7.5 |
| Block 3 | 20 | 16 | 6 |
| Block 4 | 24 | 18 | 8 |
| Block 5 | 33.5 | 17 | 6 |
| Block 6 | 20 | 13 | 6 |
| Block 7 | 34 | 27 | 8.5 |
| Block 8 | 22 | 21 | 5.5 |
| Block 9 | 33.5 | 18 | 5.5 |
| Block 10 | 28 | 15 | 5.5 |
| Block 11 | 38 | 33 | 7 |
| Block 12 | 33.5 | 23 | 5.5 |
| Block 13 | 18 | 14 | 5.5 |
| Block 14 | 20 | 17 | 5.5 |
| Block 15 | 20 | 16 | 5.5 |
| Block 16 | 15 | 8 | 5 |
| Block 17 | 27 | 14 | 6 |
| Block 18 | 20 | 14 | 5.5 |
| Block 19 | 28 | 12 | 8 |
| Block 20 | 24 | 13 | 8 |
| Block 21 | 34 | 32 | 20 |
| Block 22 | 18 | 18 | 8 |
| Block 23 | 26 | 17 | 5.5 |
| Block 24 | 22 | 20 | 8 |
| Block 25 | 24 | 18 | 6 |
| Block 26 | 20 | 19 | 6 |
| Block 27 | 22 | 18 | 8 |
| Block 28 | 30 | 23 | 5.5 |
| Block 29 | 62.5 | 33 | 20 |
| Block 30 | 10 | 8 | 6 |

Figure 1:
FIG. 1 is a picture of blocks of cellular concrete waste before crushing. The bar represents 15 cm.

As illustrated in FIG. 1 and in the table 1, the primary material coming for instance from production off-cuts of cellular concrete blocks, like thick leftover layer of material at the bottom of the mold, which is useless for the manufacture of blocks, and the rubble of the finished products, is typically constituted by parallelepiped blocks whose dimensions range from some centimeters for the smallest ones to several tenths of centimeters for the largest ones.

The density of the waste stocks of cellular concrete is typically 200 kg/m³.

The sized aggregates of cellular concrete are obtained by successive operations of crushing the cellular concrete blocks and sieving.

Figure 2:
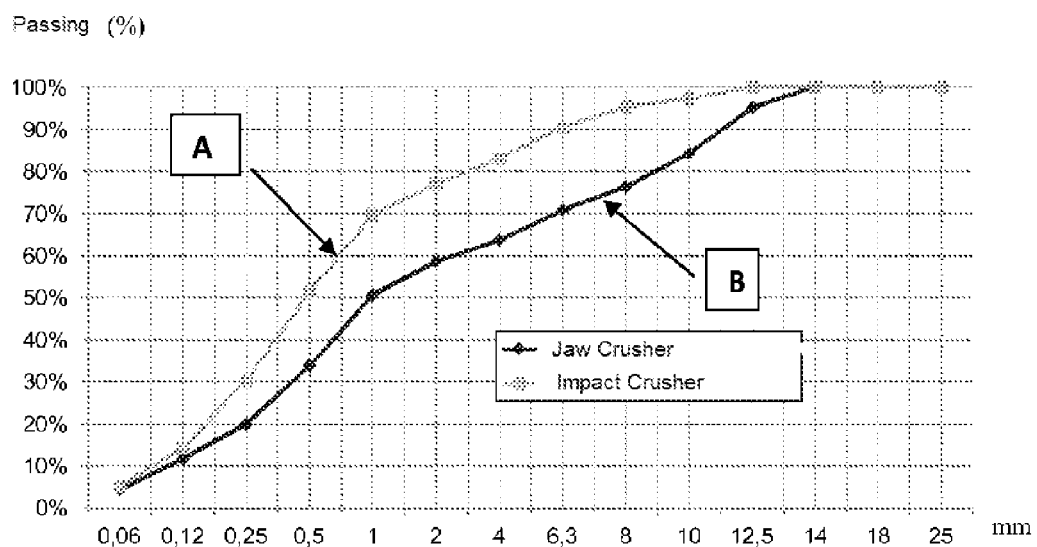
FIG. 2 represents grain size curves showing the weight % of the passing material based on the aggregates size after crushing, obtained by two types of different crushers, an impact crusher (A) and a jaw crusher (B).

The crushing is carried out by means of a jaw crusher or cylinder crusher (previously called rotor crusher). These crushing procedures are the most performing for treating this type of material since they limit the production of fines in comparison with the classic impact crushing procedure, as FIG. 2 highlights.

The sieving is advantageously realized by means of a vibrating sieve provided with at least 2 decks of screens, which enable to separate the aggregates respectively into larger or smaller aggregates than the desired bit sizes.

To prevent any risk of clogging the screens, the sieving must be realized without washing and the aggregates of sieved cellular concrete must be as free of moisture as possible. That is why ideally the wastes of cellular concrete to be treated should be stored in a dry place protected from rain.

To obtain the intended grain size distribution, the mesh size between the bars of each screen is preferably over 2 mm with regard to the minimum and maximum intended dimensions of the aggregates. Thus, to produce for instance, a grain size distribution 4/12, that is to say a material whose aggregates size ranges from 4 mm to 12 mm, the upper screen of the sieve will have, for instance a spacing between bars of 14 mm and the lower screen will have a spacing between bars of 6 mm.

As a general rule, the sieving screens of a crusher typically having a surface between 4 and 8 m² present an inclination of 30-40° with regard to the horizontal, so as to allow a rapid evacuation of the non-passing material and to allow increasing the passing portion.

On the contrary, in the case of the crushing of cellular concrete type materials to produce aggregates with a rounded shape and to break or polish the angular parts of the aggregates during the process, it is provided that the sieving screens are the less inclined as possible so as to maximize the rebounds of the aggregates on the screens, typically from 15° to 25°. The effect of this operation can be appreciated in FIG. 3. It allows obtaining more resistant aggregates for their transport and better suited to their use in concrete, which are typically characterized by shape factors. To characterize the aggregates, the following dimensions have been determined on the basis of the convex prism (circumscribed) and random 2D cuts over a population of several hundred aggregates having an average size between 2 mm and 25 mm:

1. The maximum dimension of the convex prism
    2. The intermediate dimension of the convex prism
    3. The smallest dimension of the convex prism
    4. The surface A of the cut aggregates
    5. The perimeter P of the cut aggregates.

The morphological features of the aggregates are defined according to the following measures:

The elongation factor "q", defined as the ratio between the intermediary dimension and the largest dimension of the convex prism;
    The flattening factor "p" defined as the ratio between the smallest dimension and the intermediary dimension of the convex prism;
    The shape factor "F" defined by the ratio between p and q
    The sphericity "$\Psi$" defined according to the equation E1
    The circularity "C", defined according to the equation E2

$$\psi = \frac{12.8(\sqrt[3]{p^2 q})}{1 + p(1+q) + 6\sqrt{1 + p^2(1+q^2)}} \qquad \text{Equation E1}$$

$$C = \frac{4 \cdot \Pi \cdot A}{P^2} \qquad \text{Equation E2}$$

The aggregates produced from cellular concrete must approximate a spherical form without significant roughnesses that would break during the transport and the preparation of the concrete.

The intended average measurements are typically as follows:

0.67<F<2
0.8≤Ψ≤0.95
0.5≤C≤0.85

FIG. 4 shows some of the results obtained.

Industrially, the process according to the invention must enable to produce at least 40% and generally 70% maximum in volume of usable sized aggregates whose average size is larger or equal to 1 mm. The productivity must reach more than 100 m³/day (i.e. more than 15 m³/h).

FIG. 5 illustrates an installation that enables to implement the manufacturing process of the aggregates. The references mentioned in this figure correspond to the different stations of this installation:

0: feeding of raw blocks
1: pre-crusher feed hopper
2: pre-crusher producing aggregates having a maximum size of 8 cm
3: sieve feed hopper
4: sieving
5: second pusher feed hopper
6: second crusher
7: fine particles
8: finished product Taking into account the significant size of certain blocs when they enter the crushing/sieving facility, it might be necessary to ensure a maximum productivity, to carry out a pre-crushing operation in order to reduce the larger blocs to, for instance, a maximum size of 8 cm.

In the embodiment as illustrated in FIG. 5, there are two crushers 2, 6 available and a sieve 4. Preferably, the crushers are jaw crushers. The material coming from the pre-crushing step from the first crusher 2 is sieved in the sieve 4 in order to recover the amount of finished product obtained during this operation and only allowing the passage to the second crusher 6 of aggregates whose size is larger than the maximum dimension of the desired cut.

The features of the aggregates obtained according to the process are typically as follows for a usage as lightweight aggregates in concrete:

Grain size distribution: aggregates sized between 2 mm minimum and 25 mm maximum (for instance: aggregates of cellular concrete 4/12). The size of the aggregates is voluntarily limited to 25 mm. Larger aggregates would cause a too significant weakening of the concrete mechanical strength, the aggregates mechanical strength being much weaker than that of the matrix of the hydraulic binder.

Bulk density in the dry state (kg/m³): minimum 200 and maximum 600 based on the category of the cellular concrete (of its initial bulk density) and the calibration of the aggregates.

Whatever the objective technical features, the mixture for manufacturing insulating lightweight concrete is made up of sand, cement, cellular concrete aggregates and water. To each objective technical feature, namely bulk density there is a corresponding specific formulation defining the dosage of each constituent. The mixture is carried out either in concrete plants, or in a cement mixer. The sized cellular concrete aggregates can be delivered in bulk by dump truck, in "big bag" packaging or in bags.

The material according to the invention is particularly intended for the manufacture of lightweight insulating concrete having as objective to reduce weight compared to traditional concrete and provide thermal and acoustic insulation. It can be used for the manufacture of slabs, screeds, walls or prefabricated formwork parts (for example: blocks, horizontal or vertical reinforcement blocks, beams, pre-walls . . . ).

The invention claimed is:

1. A method of using cellular concrete aggregates sized between 2 and 25 mm and having a bulk density in the dry state of between 200 and 600 kg/m³, comprising agglomerating by a binder and manufacturing lightweight and insulating concrete;
    wherein the cellular concrete aggregates have a shape factor with a value greater than 0.67 and less than 2; wherein the cellular concrete aggregates have a sphericity value greater than or equal to 0.8 and less than or equal to 0.95; and wherein the cellular concrete aggregates have a circularity with a value greater than or equal to 0.5 and less than or equal to 0.85.

2. A method of using cellular concrete aggregates sized between 2 and 25 mm and having a bulk density in the dry state of between 200 and 600 kg/m³, comprising agglomerating by a binder and manufacturing slabs, screeds, formwork walls or prefabricated parts.

3. A method according to claim 1 wherein the aggregates have a bulk density in the dry state ranging from 350 to 550 kg/m³.

4. A method according to claim 1, wherein the aggregates are sized from 4 to 12 mm.

5. A method according to claim 1, wherein said binder is Portland cement.

* * * * *